US010274652B2

(12) United States Patent
Endsley et al.

(10) Patent No.: US 10,274,652 B2
(45) Date of Patent: Apr. 30, 2019

(54) SYSTEMS AND METHODS FOR IMPROVING RESOLUTION IN LENSLESS IMAGING

(71) Applicant: Rambus Inc., Sunnyvale, CA (US)

(72) Inventors: Jay Endsley, Santa Clara, CA (US); Thomas Vogelsang, Mountain View, CA (US)

(73) Assignee: Rambus Inc., Sunnyvale, CA (US)

( * ) Notice: Subject to any disclaimer, the term of this patent is extended or adjusted under 35 U.S.C. 154(b) by 59 days.

(21) Appl. No.: 15/423,892

(22) Filed: Feb. 3, 2017

(65) Prior Publication Data

US 2017/0230575 A1 Aug. 10, 2017

Related U.S. Application Data

(60) Provisional application No. 62/292,049, filed on Feb. 5, 2016.

(51) Int. Cl.
*H04N 5/225* (2006.01)
*G02B 5/18* (2006.01)
*H04N 5/335* (2011.01)

(52) U.S. Cl.
CPC ......... *G02B 5/1871* (2013.01); *G02B 5/1842* (2013.01); *H04N 5/335* (2013.01)

(58) Field of Classification Search
None
See application file for complete search history.

(56) References Cited

U.S. PATENT DOCUMENTS

| 4,924,521 A | 5/1990 | Dinan et al. |
| 5,020,120 A | 5/1991 | Weldy |
| 5,148,499 A | 9/1992 | Matsumura |
| 5,764,816 A | 6/1998 | Kohno et al. |
| 5,835,637 A | 11/1998 | Houchin et al. |
| 2002/0001066 A1* | 1/2002 | Kobayashi ........... G02B 5/1876 353/31 |
| 2002/0075990 A1* | 6/2002 | Lanza .................... G01T 1/295 378/2 |
| 2007/0146531 A1* | 6/2007 | Toshikiyo ............ G02B 5/1876 348/340 |

(Continued)

OTHER PUBLICATIONS

Anat Levin, et al., "Understanding and Evaluating Blind Deconvolution Algorithms," IEEE Conference on Computer Vision and Pattern Recognition, Jun. 20-25, 2009, 8 pages.

(Continued)

*Primary Examiner* — Twyler L Haskins
*Assistant Examiner* — Dwight Alex C Tejano
(74) *Attorney, Agent, or Firm* — Silicon Edge Law Group LLP; Arthur J. Behiel

(57) ABSTRACT

An imaging device uses a grating to produce an interference pattern for capture by a photodetector array. Digital photographs and other image information can then be extracted from the pattern. An integrated processor locally supports this extraction by upsampling the captured interference pattern and deconvolving the upsampled pattern with an image-calculation parameter set that represents the grating at a resolution greater than that provided by the photodetector array. Deconvolving the upsampled pattern with a high-resolution parameter increases the resolution of extracted image information.

15 Claims, 12 Drawing Sheets

(56) References Cited

U.S. PATENT DOCUMENTS

| | | | | |
|---|---|---|---|---|
| 2008/0037125 | A1* | 2/2008 | Takamiya | G02B 5/1871 359/568 |
| 2008/0298678 | A1* | 12/2008 | Kang | H04N 1/4092 382/167 |
| 2009/0020714 | A1* | 1/2009 | Slinger | G01T 1/295 250/550 |
| 2011/0085051 | A1* | 4/2011 | Chi | H04N 5/2254 348/222.1 |
| 2011/0310267 | A1* | 12/2011 | Ichiyama | H04N 5/232 348/222.1 |
| 2014/0253781 | A1* | 9/2014 | Gill | G02B 5/1842 348/335 |
| 2014/0369623 | A1* | 12/2014 | Fletcher | G06T 7/42 382/275 |
| 2016/0073043 | A1* | 3/2016 | Stork | A61B 3/113 348/164 |
| 2017/0053390 | A1* | 2/2017 | Yoshida | G06T 5/20 |

OTHER PUBLICATIONS

Garcia-Martinez et al., "Generation of Bessel Beam Arrays Through Dammann Gratings", Mar. 20, 2012, vol. 51, No. 9, Applied Optics. pp. 1375-1381. 7 Pages.

Guerineau et al., "Generation of Achromatic and Propagation-Invariant Spot Arrays by Use of Continuously Self-Imaging Gratings," Apr. 1, 2001, vol. 26, No. 7, Optics Letters, pp. 411-413. 3 Pages.

Philips, "Philips Research—The History of the CD—Technology", http://www.research.philips.com/technolgies/projects/cd/technology.html, 2015 [Accessed Jan. 5, 2016]. 2 Pages.

Wikipedia, "Oversampled Binary Image Data," Dec. 25, 2015, https://en.wikipedla.org/w/index.php?title=Oversampled_binary_image_sensor&oldid=695780031 [accessed Jan. 5, 2016], 4 Pages.

* cited by examiner

SYSTEMS AND METHODS FOR IMPROVING RESOLUTION IN LENSLESS IMAGING

BACKGROUND

A relatively new type of image-sensing device uses one or more gratings to project interference patterns for capture by a photodetector array. The interference patterns are visibly quite different from captured scenes, but contain sufficient information to mathematically reconstruct the scenes or aspects of the scenes. Images and other image data can thus be captured without a lens, and imaging systems can be made smaller than those reliant on lenses and ray-optical focusing. Embodiments of such image-sensing devices are detailed in U.S. publication 2014/0253781 and international publication WO 2015/195417, which are incorporated herein by reference.

BRIEF DESCRIPTION OF THE DRAWINGS

The detailed description is illustrated by way of example, and not by way of limitation, in the figures of the accompanying drawings and in which like reference numerals refer to similar elements and in which.

DETAILED DESCRIPTION

Figure 1:
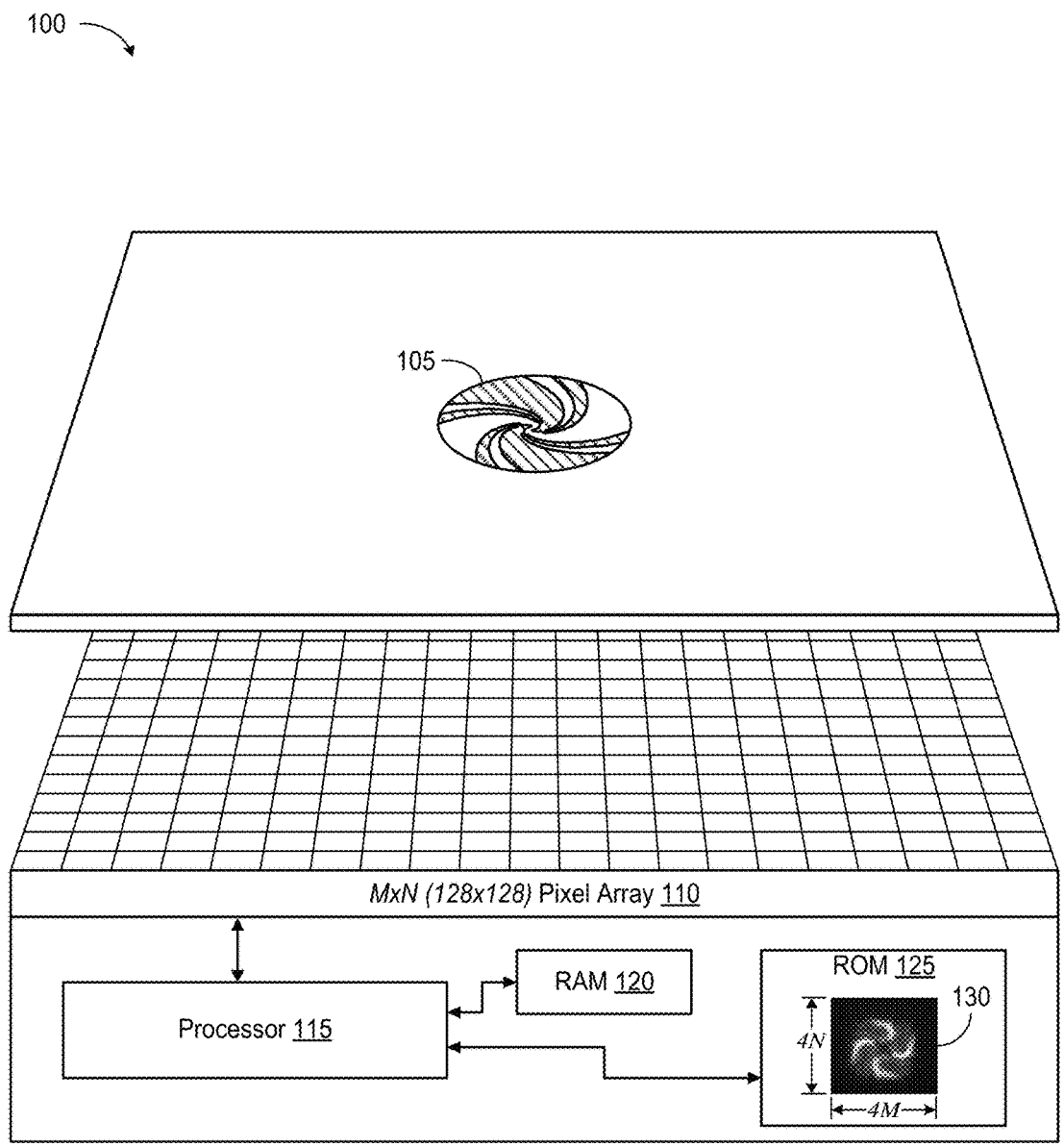
FIG. 1 depicts an imaging device 100 with a binary, phase-antisymmetric grating 105 overlying a photodetector array 110.

FIG. 1 depicts an imaging device 100 with a binary, phase-antisymmetric grating 105 overlying a solid-state photodetector array 110, such as a CCD (charge-coupled device), CMOS (complementary metal-oxide-semiconductor) image sensor, or (in the case of thermal IR detection) a microbolometer or thermopile array sensor. Grating 105 produces an interference pattern for capture by array 110. Digital photographs and other image information can then be extracted from the pattern. In this embodiment, device 100 includes an integrated processor 115, random-access memory (RAM) 120, and read-only memory (ROM) 125 that locally support this extraction.

Processor 115, supported by RAM 120, performs a Fourier deconvolution of an interference pattern captured by array 110 using a set of one or more image-calculation parameters 130 stored in ROM 125. Image-calculation parameters 130 characterize grating 105 at an image-processing resolution that is greater than that on offer from array 110, four times greater in each of the X and Y dimensions in this example. Employing the relatively high-resolution parameter set 130 improves the resolution of extracted image information.

Parameter set 130 can represent the point-spread function (PSF) of grating 105, or a Fourier transform of the PSF, and can also include other parameters or lookup tables in support of image processing. For example, parameter set 130 can support e.g. barrel-distortion correction, noise filtering, and sensor-specific corrections. An imaging system tailored to preferentially sense objects that exhibit spatial frequencies and orientations over expected ranges can include an image-calculation parameter that is a function of both those expected ranges and the PSF of grating 105. In this sense, one or more image-calculation parameter set 130 can be considered a filter for extracting properties of interest from raw sensor data.

Figure 2A:
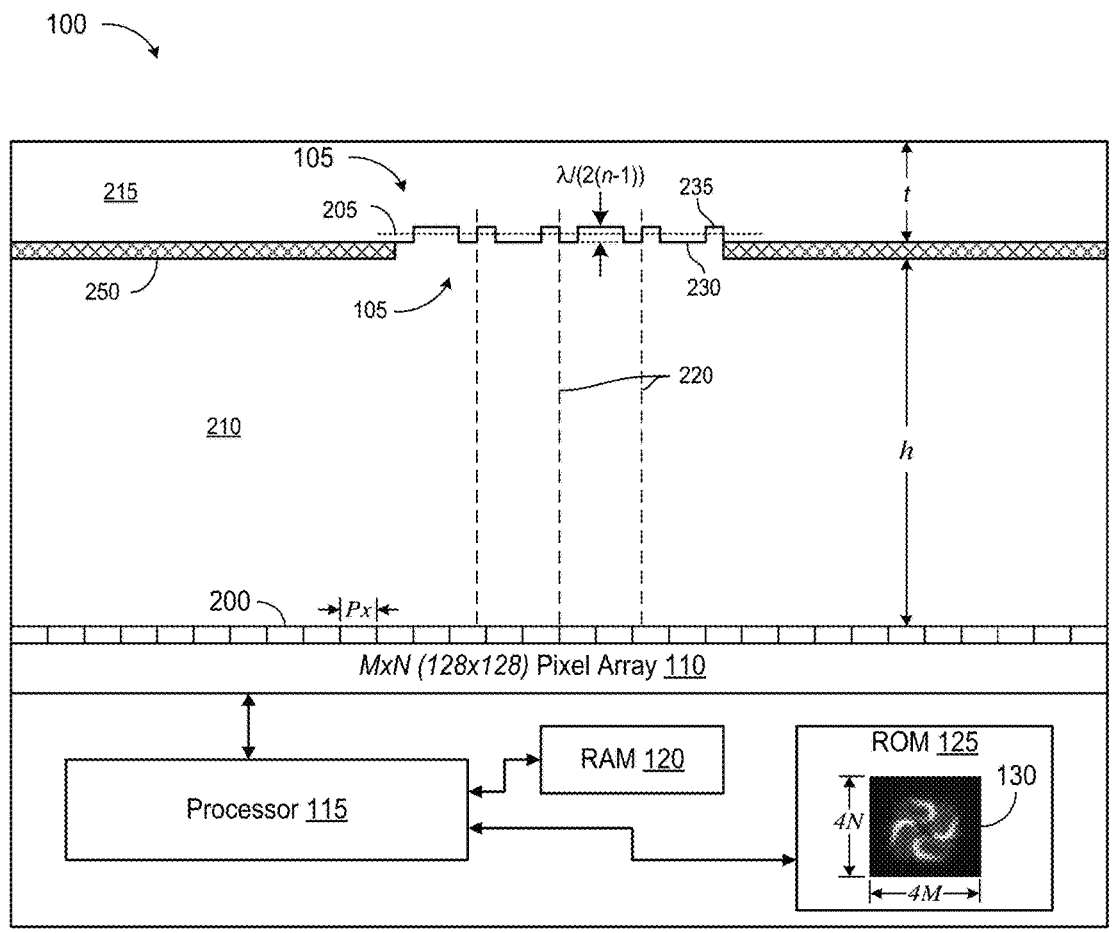
FIG. 2A is a cut-away view of imaging device 100 of FIG. 1.

FIG. 2A is a cut-away view of imaging device 100 of FIG. 1. Photodetector array 110 includes photoelements 200, and may additionally include a lenslet array that concentrates incident photons onto the most sensitive areas of array 110 to increase quantum efficiency. Grating 105 is formed by an interface between light-transmissive media of different refractive indices, an optical Lanthanum dense flint glass layer 210 and polycarbonate plastic layer 215 above grating 105 in this visible-light example. Light within a continuous or broken wavelength band of interest strikes grating 105 from a direction that is normal to the plane 205 of grating 105. Layer 210 is of height h of about 150 μm and array 110 has a pixel pitch Px of 2.4 μm, but these dimensions can vary.

Each of three boundaries of odd symmetry 220 is indicated using a vertical, dashed line. The raised features 235 of grating 105, relative the lower features 230, induce phase differences of half of a wavelength λ (π radians), plus an integer multiple of the wavelength, to produce curtains of destructive interference at the pixel array. Due to dispersion, the difference in the refractive index of the Lanthanum dense flint glass layer 210 and the polycarbonate 215 above grating 105 is an increasing function of wavelength, facilitating a wider wavelength band of interest over which the phase delay is approximately π radians.

An optional opaque layer 250 is patterned to include an aperture that encompasses or defines the effective limits of grating 105. The aperture windows the incoming light, which tends to reduce edge effects that result from subsequent image-recovery algorithms. The aperture can also improve angle sensitivity and spurious light rejection, which can be advantageous for e.g. motion detection and measurement. Opaque layer 250 can be applied directly to a layer forming grating 105, and may be coplanar or nearly coplanar with grating 105. Other embodiments omit the integrated aperture, or may include an aperture spaced away from device 100 instead of or in addition to the aperture in layer 250.

This example assumes light incident the light interface of device 100 is normal to the plane of phase grating 105. By Huygens' Principle, pairs of spherical wave re-radiators equidistant from one of the boundaries of odd symmetry 220 cancel each other out due to the half-wavelength phase delay of the radiator on one side of the boundary 220 compared to the other. Light of any wavelength in the band of interest thus destructively interferes to produce curtains of minimum intensity that extend to array 110 under boundaries 220. Constructive interference similarly produces foci of maximum intensity. Grating 105 therefore produces an interference pattern for capture by array 110. Advantageously, the features of grating 105 offer considerable insensitivity to the wavelength of incident light in a wavelength band of interest, and also to the manufactured distance h between grating 105 and photodetector array 110. Further, both the low and high features 230 and 235 admit light, which provides high quantum efficiency relative to embodiments that selectively block light (e.g., embodiments that employ amplitude gratings).

Figure 2B:
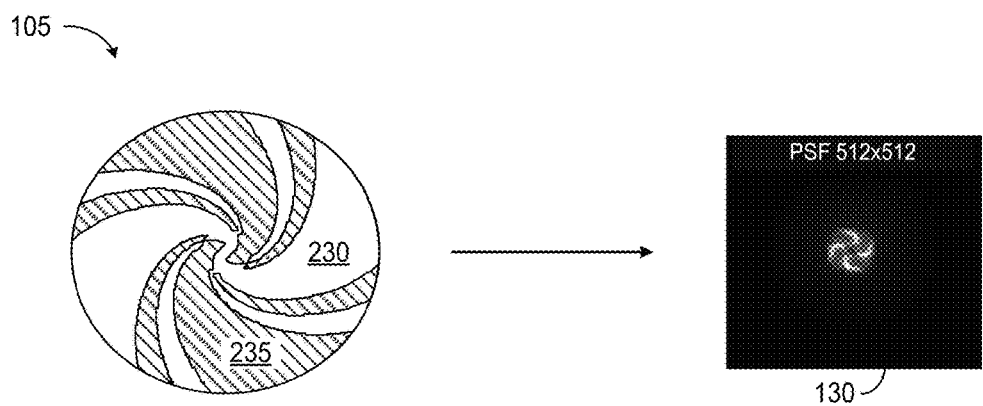
FIG. 2B includes a plan view of grating 105 in accordance with an embodiment in which grating 105 includes spiral features 230 and 235 to produce two-dimensional diffraction patterns.

FIG. 2B includes a plan view of grating 105 in accordance with an embodiment in which grating 105 includes spiral features 230 and 235 to produce two-dimensional diffraction patterns. Relatively narrow (wide) segment spacing works better for relatively high (low) frequencies, and feature spacing increases along odd-symmetry boundaries (between elevated and recessed grating regions, represented by dark and light) with distance from the center. Curved boundaries of odd symmetry, defined between the elevated and recessed regions, extend radially from the center of the grating to the periphery, radiating out between the dark (elevated) and light (recessed) arms near the center. In some embodiments, the functional form of the curved boundaries approximates a logarithmic spiral. The area of grating 105 can be greater than that of the aperture in layer 250 (FIG. 2A) to provide alignment tolerance in manufacturing.

Processor 115 uses parameter set 130 in ROM 125 to extract imaging information. Parameter set 130 should therefore accurately represent the characteristics of grating 105. Integrated-circuit (IC) processes can be counted on to produce consistent gratings, so parameter set 130 can be calculated using simulations or from a representative grating. Alternatively, parameter set 130 can be computed for the specific grating 105 used in device 100. A method for finding a parameter of higher resolution than that provided by array 110 is detailed below in connection with FIGS. 3A and 3B. In particular, a PSF with an effective resolution of 512×512 is garnered using an imaging array of just 128×128 pixels.

Although device 100 can include or be used with an optical element that focuses light (e.g., a lens), device 100 does not require a focusing element to produce images. Device 100 captures a diffraction pattern that bears little resemblance to an imaged scene, but that is nevertheless interpretable by a computer or processor. Grating 105 creates a certain point-spread response (PSR), a multi-armed thin spiral in this example, on the sensor array for every point of light in the imaged scene. This PSR, when sampled, represents the PSF of grating 105. The location of the center of the PSR is uniquely determined by the incident angle of light from the point source. Since faraway scenes can be thought of as collections of point sources of varying intensity, the sensed signals resemble a convolution of the PSF with the faraway scene. A scene can be computationally reconstructed from its corresponding interference pattern if there is a 1:1 map of scenes to sensor readings. In the case where the sensed signals are well approximated by a convolution with a fixed PSF, the Fourier components of the scene that are recoverable are the same as the Fourier components of the PSR with sufficient power to be observable above the noise sources in the system.

Figure 3:
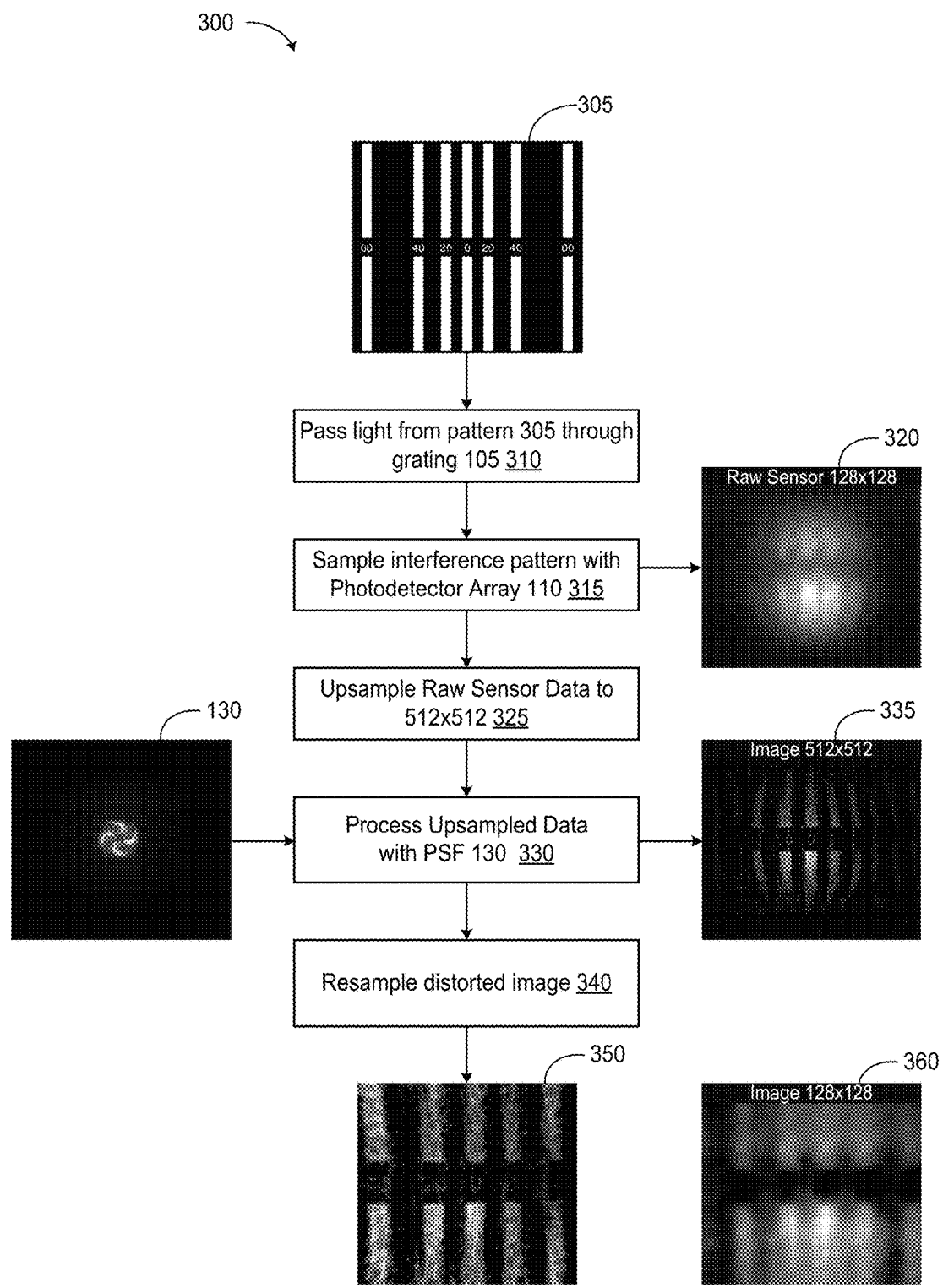
FIG. 3 is a flowchart 300 detailing how a scene 305—a test pattern in this example—is captured and resolved using an embodiment of imaging device 100 of FIG. 1.

FIG. 3 is a flowchart 300 detailing how a scene 305—a test pattern in this example—is imaged using an embodiment of imaging device 100 of FIG. 1. Scene 305 is presented such that light from scene 305 is incident grating 105. The incident light passes through phase grating 105 to produce an intensity pattern (310), which pattern is then sampled by array 110 (315) to produce raw sensor data 320. The captured interference pattern—raw sensor data 320—has an image-capture resolution of 128×128 pixels due to the number of pixels in array 110. Snell's law produces demagnification that increases with incident angle if the refractive index between grating and array is larger than one, as in this example. This effect produces the "barrel distortion," or "fisheye," evident in raw sensor data 320.

Raw data 320 are upsampled (325), in this example by a factor of four in each dimension, to produce a representation of raw sensor data 320 at an image-processing resolution of 512×512 pixels. In one example of upsampling, an intensity value for each sampled pixel is replicated to produce a two-by-two set of four adjacent pixels of that same value. Each of the image-capture pixels is thus extended to a two-by-two array of neighboring and adjacent equivalent pixel values. The upsampled response is thus represented at an elevated resolution of 512×512 pixels in this example.

Parameter set 130 includes an expression of the PSF of grating 105, possibly in combination with the underlying array, which may be known from a prior calibration or high-fidelity simulation. The way in which the PSF of grating 105 varies as a function of incident angle and color may also be similarly determined. The PSF of parameter set 130 is expressed at the image-processing resolution to match the upsampled response. The upsampled response is deconvolved using the PSF of parameter set 130, by e.g. Fourier-domain image processing, to construct a barrel-distorted image data 335 of a resolution of 512×512 pixels. Distorted image data 335 can be resampled (340) to counteract the barrel distortion or otherwise improve the recovered image, and thus produce a reduced-distortion 512×512 image 350 of scene 305. For comparison, FIG. 3 includes a 128×128 image 360 of scene 305 acquired by deconvolving raw sensor data 320 with a PSF of 128×128 pixels; the relatively poor spatial resolution is plainly evident.

Figure 4A:
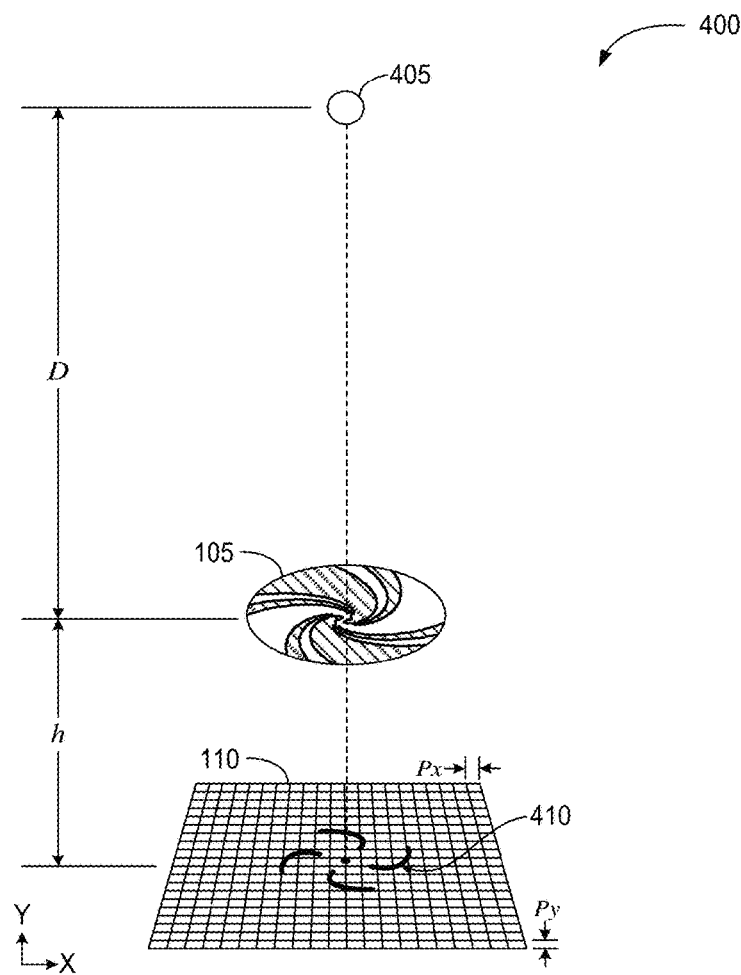
FIG. 4A depicts an optical path 400 to illustrate how the relatively high-resolution image-calculation parameter set 130 of FIG. 1 is captured using a relatively low-resolution array 110.

FIG. 4A depicts an optical path 400 to illustrate how the relatively high-resolution (512×512) PSF of parameter set 130 of FIG. 1A is captured using a relatively low-resolution (128×128) array 110 in accordance with one embodiment. A point source 405 is positioned a distance D away from grating 105 to produce a point-spread response (PSR) 410 on the underlying array 110. The center of response 410 is emphasized using a "dot" to show its position relative to the pixels, and each pixel is assumed to be square, having a pitch Px in the X dimension and an equivalent pitch Py in the Y dimension. Recalling that h is the separation between grating 105 and array 110, displacing point source 405 in the X/Y plane displaces response 410 on array 110 in the opposite direction and by an amount proportional to h/D. Collections of responses taken with sub-pixel shifts in the X and Y dimensions are combined to produce a high-resolution PSF for parameter 130. In this example, responses are shifted by Px/4 and Py/4 to increase the resolution of the PSF to sixteen (4×4) times that of array 110.

Figure 4B:
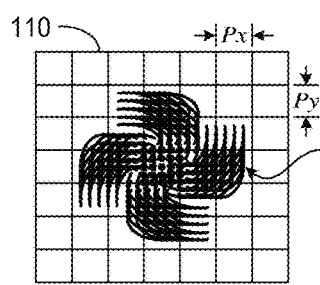
FIG. 4B shows some pixels of array 110 with twenty-five overlapping instances of a point-spread response (PSR) 410, each offset from its nearest neighbor(s) by a one-fourth of the pixel pitch in the relevant dimension.

FIG. 4B shows some pixels of array 110 with twenty-five overlapping instances of response 410 each offset from its nearest neighbor(s) by a one-fourth of the pixel pitch in the relevant dimension. Each point-spread response 410 is separately sampled to obtain a relatively low-resolution PSR for a given X/Y parameter. Twenty-five low-resolution PSRs are thus acquired.

Figure 4C:
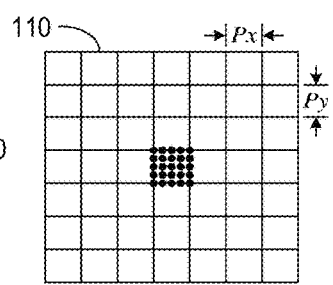
FIG. 4C shows the same pixels as FIG. 4B with just the centers of the offset PSRs 410 to show how they are arranged relative to the center pixel.

FIG. 4C shows the same pixels as FIG. 4B with just the centers of the offset PSRs 410 to show how they are arranged relative to the center pixel. The set of PSRs provide sixteen unique measurements relative to the center pixel: the measurements at either edge of the center pixel are redundant. This set of responses is sampled and the resultant responses are logically aligned and summed to produce data representing PSR 130 at a resolution four times that of array 110. During calibration of a real grating and array, some error might be introduced by inaccuracies in determining distance D, height h and placement of point 405. Such inaccuracies may not matter if the PSF is oversampled with substantially the resolution of FIG. 4C and snapped to the target resolution, in this example 512×512.

Figure 4D:
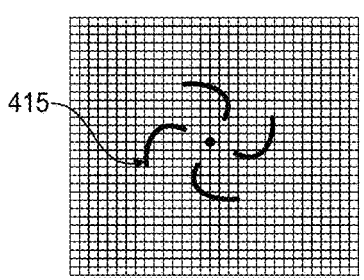
FIG. 4D depicts the responses of FIG. 4B logically aligned over a representation of the resultant four-by-four increase in effective resolution.

FIG. 4D depicts the responses of FIG. 4B logically aligned over a representation of the resultant four-by-four increase in effective resolution. The alignment superimposes PSRs 410 by logically shifting the pixel array by increments of ¼ the pixel pitch to produce a "super-resolution" PSF 415 that can serve as an image-calculation parameter, or as the basis for one. More or fewer measurements can be taken over the same or different areas of array 110. This example is a graphical representation of a PSF used as e.g. image-calculation parameter 130 introduced in FIG. 1, and can be used to deconvolve the upsampled image data in the foregoing discussion of FIG. 3.

Figure 5:
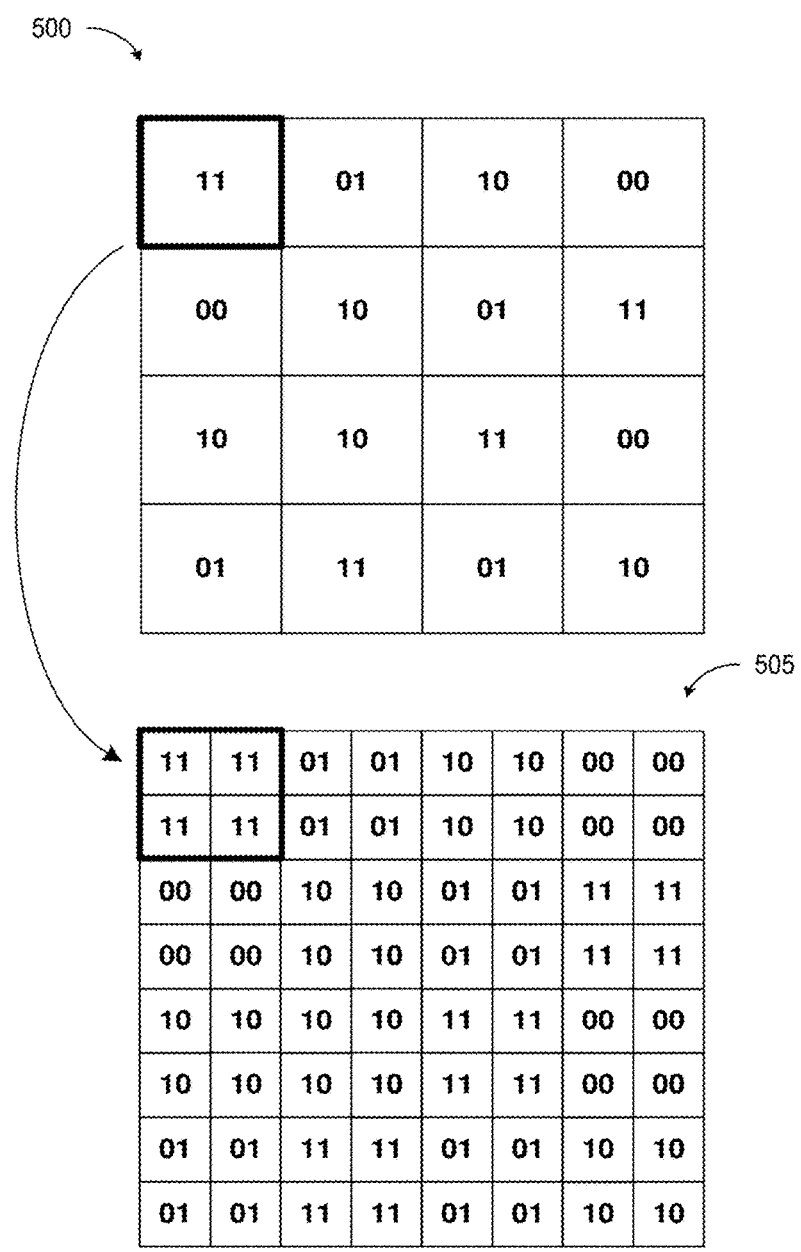
FIG. 5 illustrates how image data is upsampled by a factor of four in accordance with one embodiment.

FIG. 5 illustrates how image data is upsampled by a factor of four in accordance with one embodiment. This simple example assumes a four-by-four array 500 of captured pixel values, each representing a light intensity using a two-bit binary number from 00 to 11. This collection of values is upsampled to create a sixteen-by-sixteen array 505 by converting each number of array 500 into a two-by-two array of the same number. Other forms and degrees of upsampling can also be used, and the degree of upsampling can be different for the X and Y axes.

Figure 6:
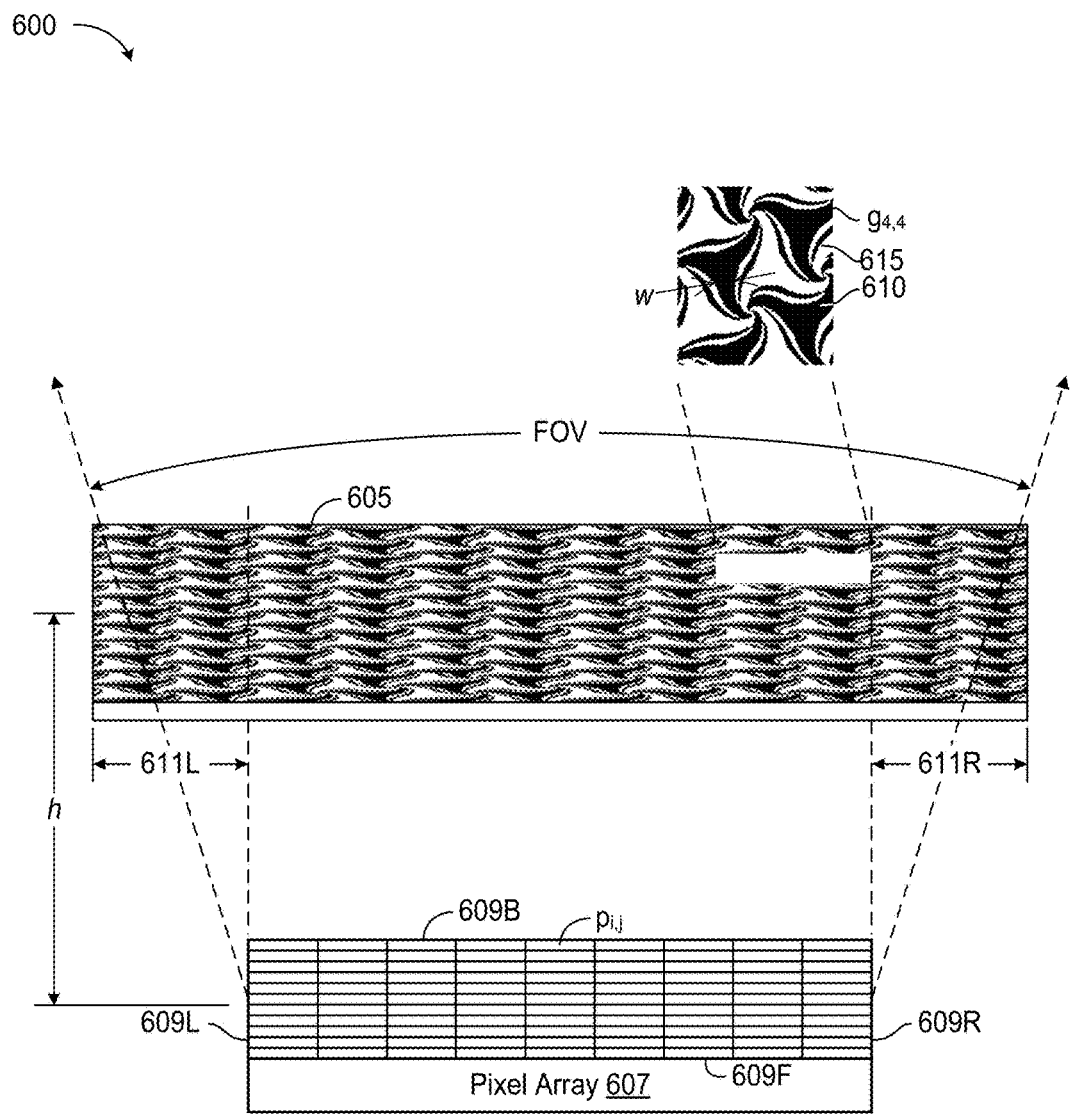
FIG. 6 depicts an infrared (IR) imaging device 600 that employs a phase grating in lieu of a lens.

FIG. 6 depicts an infrared (IR) imaging device 600 that employs a phase grating in lieu of or in addition to a lens. Devices that sample light within the infrared region of the electromagnetic spectrum typically use relatively low-resolution sensors, so resolution improvements can be particularly advantageous. Moreover, employing a phase grating in lieu of a lens can dramatically reduce size and cost.

Viewed from a perspective normal to the active surface, device 600 includes a phase grating layer 605 spaced by a height h above an array 607 of pixels $p_{i,j}$, where i and j refer to locations along the respective X and Y axes. Grating layer 605 includes a repeating pattern of subgratings $g_{i,j}$, of which one subgrating $g_{4,4}$ is shown from the normal perspective for ease is of viewing; the remaining subgratings $g_{i,j}$ are identical in this example.

Pixel array 607 includes a first edge 609L, a second edge 609R, a third edge 609F, and a fourth edge 609B. Phase grating layer 605 includes left and right portions 611L and 611R that extend beyond the respective left and right edges of the underlying pixel array 607. Portions 611L and 611R are columns of subgratings that repeat the pattern of subgratings $g_{i,j}$ that extends over and between left and right edges 609L and 609R. Rows of repeating subgratings likewise extend beyond the respective front and back edges 609F and 609B of pixel array 607. The overlapping portions extend over the field of view FOV for imaging device 600.

Phase gratings of the type used for subgratings $g_{i,j}$ are detailed in U.S. patent application Ser. No. 14/677,878 to Stork et al, which is incorporated herein by this reference. Briefly, and in connection with subgrating $g_{4,4}$, subgratings $g_{i,j}$ are of a material that is transparent to IR light. The surface of subgratings $g_{i,j}$ includes transparent features 610 (black) and 615 (white) that define between them boundaries of odd symmetry. Features 610 are raised in the Z dimension (normal to the view) relative to features 615, and are shown in black to elucidate this topography. Features 610 and 615 form six-armed spiral shapes in this embodiment (the black and white features both contribute "arms" that contribute to the point-spread function of the grating). The width W of the thickest portion of the arms is about 120 microns. The boundaries between features 610 and 615 produce an interference pattern on the underlying pixel array that contains rich spatial information about an imaged scene. This spatial information can be processed using e.g. Fourier- or spatial-domain deconvolution to render photographs or identify features of interest in the imaged scene.

Fourier-domain image calculation implicitly assumes that the point-spread function of the imaged interference pattern wraps around at the edges of the pattern. The portions of grating layer 605 that extend beyond the edges of pixel array 607 (e.g., portions 611L and 611R) extend the interference pattern in support of Fourier-domain strategies. Subgratings $g_{i,j}$ are tiled with copies along the borders of layer 605 that extend out from pixel array 607 to cover all angles from which incident light is likely to strike array 607.

Figure 7:
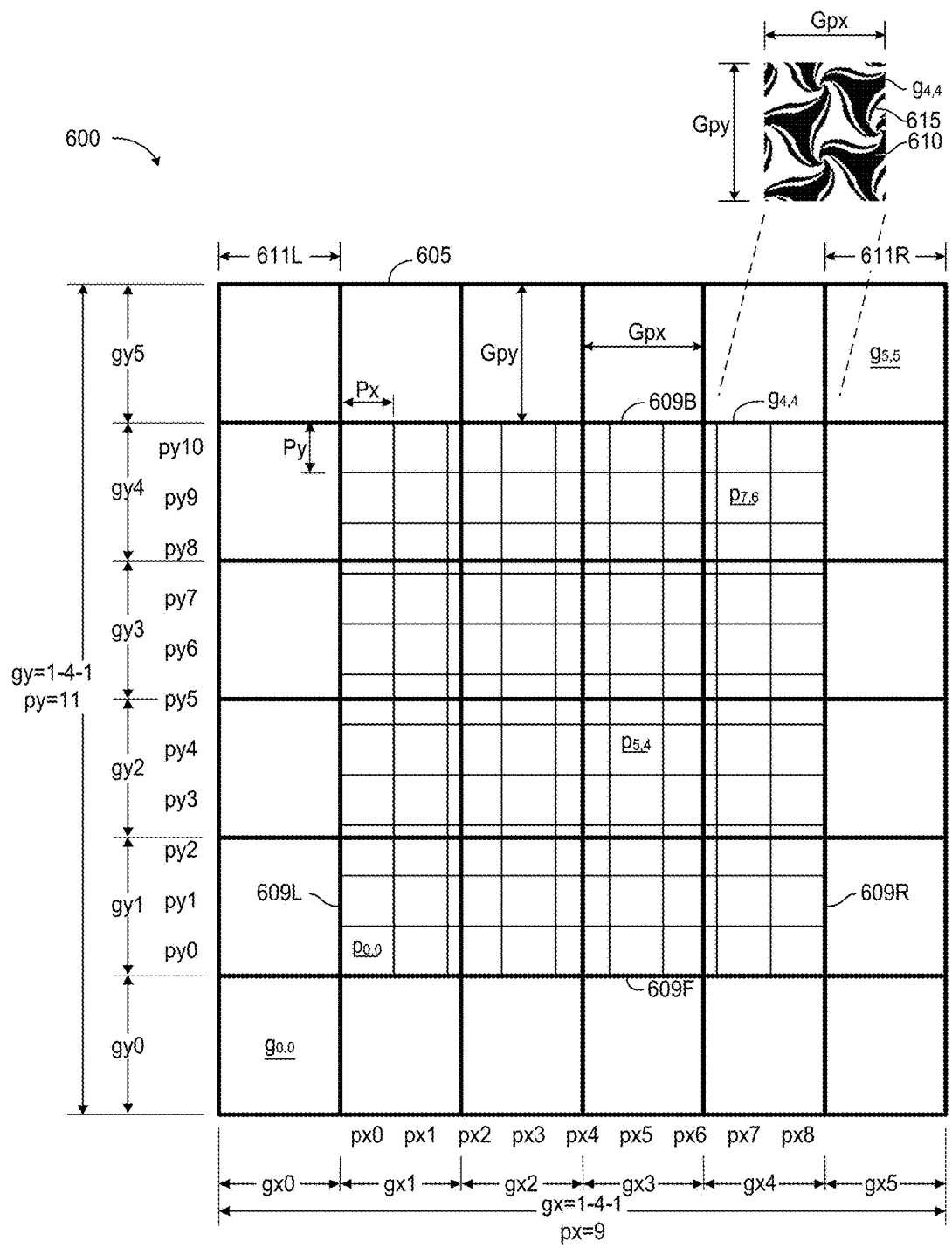
FIG. 7 is a plan view of imaging device 600 of FIG. 6.

FIG. 7 is a plan view of imaging device 600 of FIG. 6. Of the repeating pattern of subgratings $g_{i,j}$, only subgrating $g_{4,4}$ is shown in detail; the remaining subgratings $g_{i,j}$ are identical in this example, and are highlighted using bold boundaries to show their placement, orientation, and size relative to underlying pixels $p_{i,j}$. Subgratings $g_{i,j}$ are rectangular in this embodiment, with a minimum dimension Gpx in the x dimension and a maximum dimension Gpy in the y dimension, though the subgratings can be different shapes and sizes in other embodiments.

Subgratings $g_{i,j}$ are arranged in a two-dimensional array with a number gx along the X axis and a number gy along the Y axis. Both subgrating numbers gx and gy are six in this simple example, but either or both numbers can be the same or different. The array of pixels $p_{i,j}$ includes a number px along the X axis and a number py along the Y axis. Numbers px and py are nine and eleven, respectively, but either or both can be different.

Pixel count px is coprime with the subgrating count gx along the X axis and between edges 609L and 609R; that is, pixel numbers px and gx between portions 611L and 611R share no common integer factor other than one. Likewise, the pixel count py is coprime with the subgrating count gy along the Y axis and between edges 609F and 609B. With this arrangement, imaging device 600 obtains px times py independent samples of the interference pattern created by a single instance of a subgrating $g_{i,j}$. The effective pixel pitch is 1/gy times pixel pitch Py in the Y dimension and 1/px times the pixel pitch Px in the X dimension. Unless otherwise specified, the X and Y dimensions refer to the Cartesian coordinate system defined by the array of subgratings.

Though not shown, pixel arrays can include superfluous pixel structures that are e.g. defective or redundant and/or for various other reasons may not be used for image capture. Such superfluous structures may not be "pixels" as that term is used herein, as that term generally refers to elements that provide a measurement of illumination that is used for image acquisition. Redundant pixels can be used to take multiple measurements of pixels in equivalent positions, reducing noise.

Figure 8:
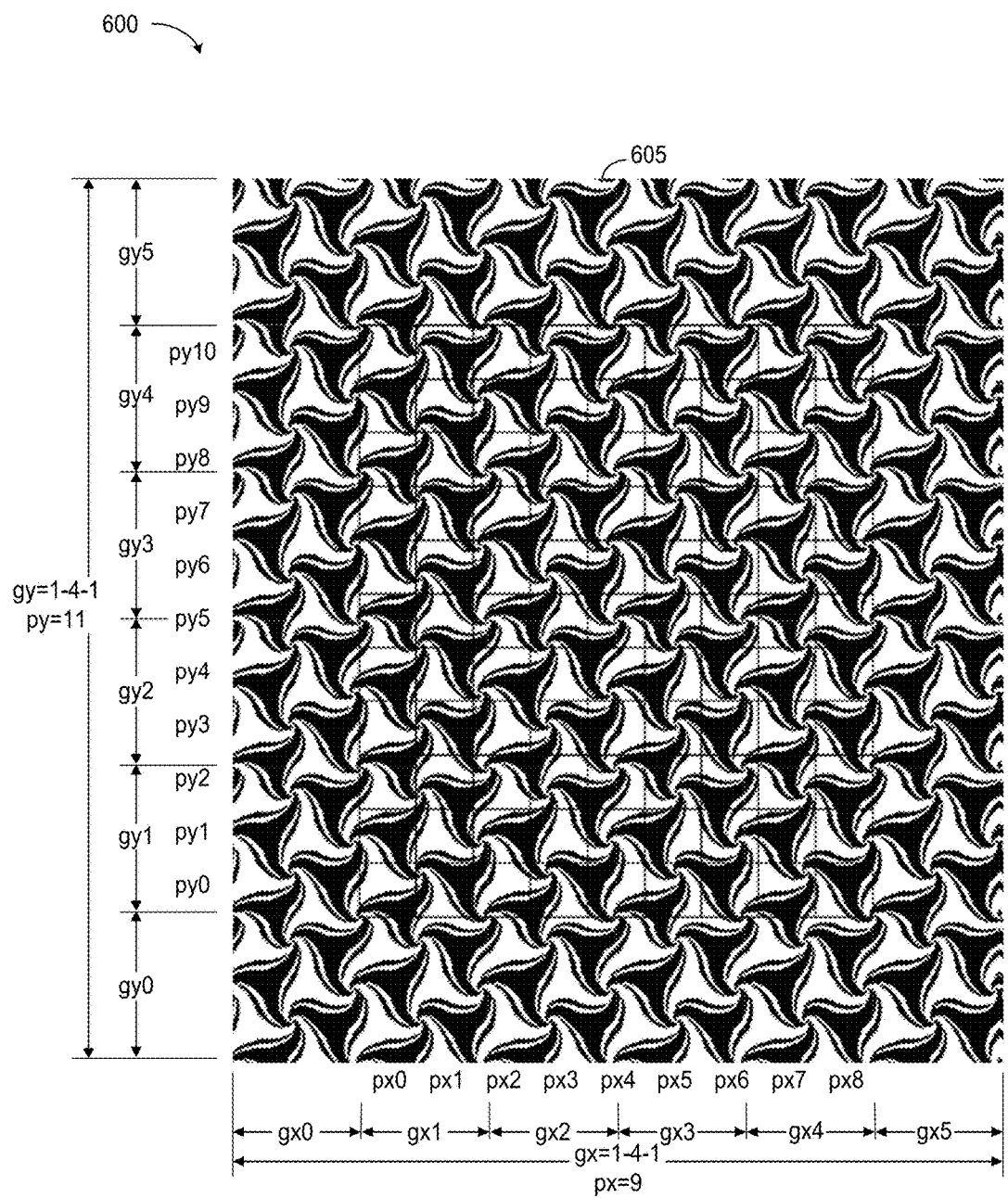
FIG. 8 shows IR imaging device 600 of FIGS. 6 and 7 with the full tessellation of subgratings $g_{i,j}$ that make up phase grating layer 605.

FIG. 8 shows IR imaging device 600 of FIGS. 6 and 7 with the full tessellation of subgratings $g_{i,j}$ that make up phase grating layer 605. The boundaries between subgratings $g_{i,j}$ are contiguous across tessellation borders, so the borders are not easily visible. Individual subgratings are nevertheless readily identifiable with reference to their Cartesian coordinates expressed along the X axis as gx[5:0] and along the Y axis as gy[5:0]. For example, subgrating $g_{5,5}$ in the upper right corner is located in the intersection of column gx5 and row gy5. Pixels $p_{i,j}$ are likewise identifiable along the X axis as px[8:0] and along the Y axis as py[10:0].

Figure 9:
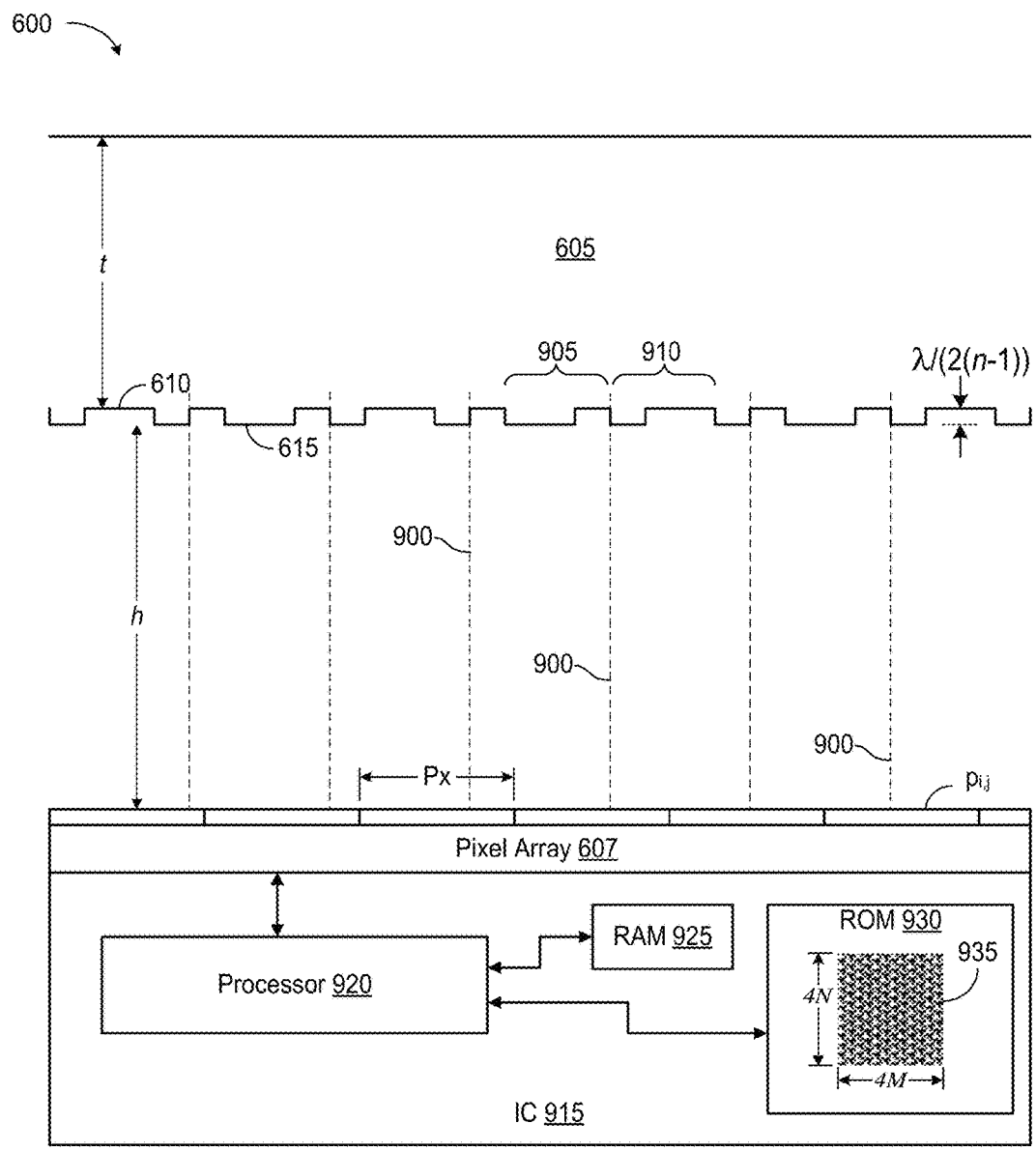
FIG. 9 is a cut-away view of imaging device 600 of FIGS. 6-8.

FIG. 9 is a cut-away view of imaging device 600 of FIGS. 6-8. Grating layer 605 is a binary, odd-symmetry silicon phase grating of thickness t separated from pixel array 607 by an air interface of optical height h equal to 300 μm. (In general, optical height h is the sum, for every material between grating 605 and pixel array 607, of the physical height divided by the index of refraction through that material.) Silicon is a relatively inexpensive material that has high IR transmission, and it can be patterned using well-known semiconductor processes. Other materials are suitable, however, and can be selected for different wavelengths, or for other material or cost considerations. Thickness t and height h are 500 μm and 300 μm, respectively. Pixel pitch Px along the X dimension is about 100 μm; pixel pitch Py (FIG. 7) is similar. Any or all of these dimensions can vary in other embodiments.

Height h can be related to the wavelength of incident light, width W of widest portions of phase features 610 and 615, and the grating design. The phase features contain some extended elements longer than they are wide. Let the typical widths of these elements be W and a wavelength within the band of interest be l. Height h, the effective optical vertical separation between phase-generating layer 605 and pixel array 607, follows the formula $h = W^2/(k \cdot l)$ where "k" is a constant governed by the grating design. For phase antisymmetric gratings using two free parameters (or "interference fringes"), the optimal value for k may be in the range of two to six; more generally k may range from approximately 0.3 to 10. Broadly speaking, the optimal k tends to be towards the low end of this range in designs using more interference fringes, and towards the higher end of this range with smaller numbers of interference fringes. In one embodiment, width W of one of the thickest arms is about 120 microns, the effective optical height h is 416 microns, and the wavelength l is about 10 microns. Substituting into the formula $k = W^2/l/h$, the value k for this embodiment is about 3.4. Grating 605 has a value k in the range of from about two to six, though k can be outside this range (e.g., between 1.5 and 5) in other embodiments.

Adjacent features 610 and 615 form six illustrative odd-symmetry boundaries 900, each indicated using a vertical, dashed line. The lower features 615 induce phase retardations of half a wavelength (π radians) relative to upper features 610. Features 905 and 910 on either side of each boundary exhibit odd symmetry. With this arrangement, paired features induce respective phase delays that differ by approximately half a wavelength λ over the wavelength band of interest, approximately 5 μm (half of 10 μm) in this example for imaging within the IR spectrum. The different phase delays produce curtains of destructive interference separated by relatively bright foci to produce an interference pattern on pixel array 607. Stepped features 905 and 910 are of uniform width in this simple illustration, but vary across each subgrating $g_{i,j}$ and collection of subgratings. Curved and divergent boundaries of odd symmetry, as illustrated in FIGS. 6-8, provide rich patterns of spatial modulations that can be processed to extract photos and other image information from a scene.

Pixel array 607, also called a "thermographic" or "thermal-imaging" array, can be cooled to support certain types of IR sensitive semiconductors. Cooling adds complexity and cost, and requires power. The pixels in uncooled detectors are mostly based on pyroelectric and ferroelectric materials or microbolometer technology. Uncooled sensors may provide inferior image quality, but can be substantially simpler, smaller, and less expensive.

Imaging device 600 includes an IC device 915 that supports image acquisition and processing. IC 915 includes a processor 920, random-access memory (RAM) 925, and non-volatile read-only memory (ROM) 930. ROM 930 stores an image-calculation parameter 935 and other information or lookup tables in support of image processing. Parameter 935 represents the PSF of the overlying grating at a resolution greater than that on offer from pixel array 607. Processor 920 captures digital image data from the pixel array, upsamples that data to match the resolution of parameters 935, and uses the upsampled data and parameters 935 to compute e.g. images and other image data. Processor 920 uses RAM 925 to read and write data in support of image processing. Processor 920 may support specialized processing elements that aid fast, power-efficient Fourier- or spatial-domain deconvolution, for example. All the components of device 600 can be integrated into the same device or package using microfabrication techniques, or some or all processing can take place at a location remote from array 607.

Figure 10:
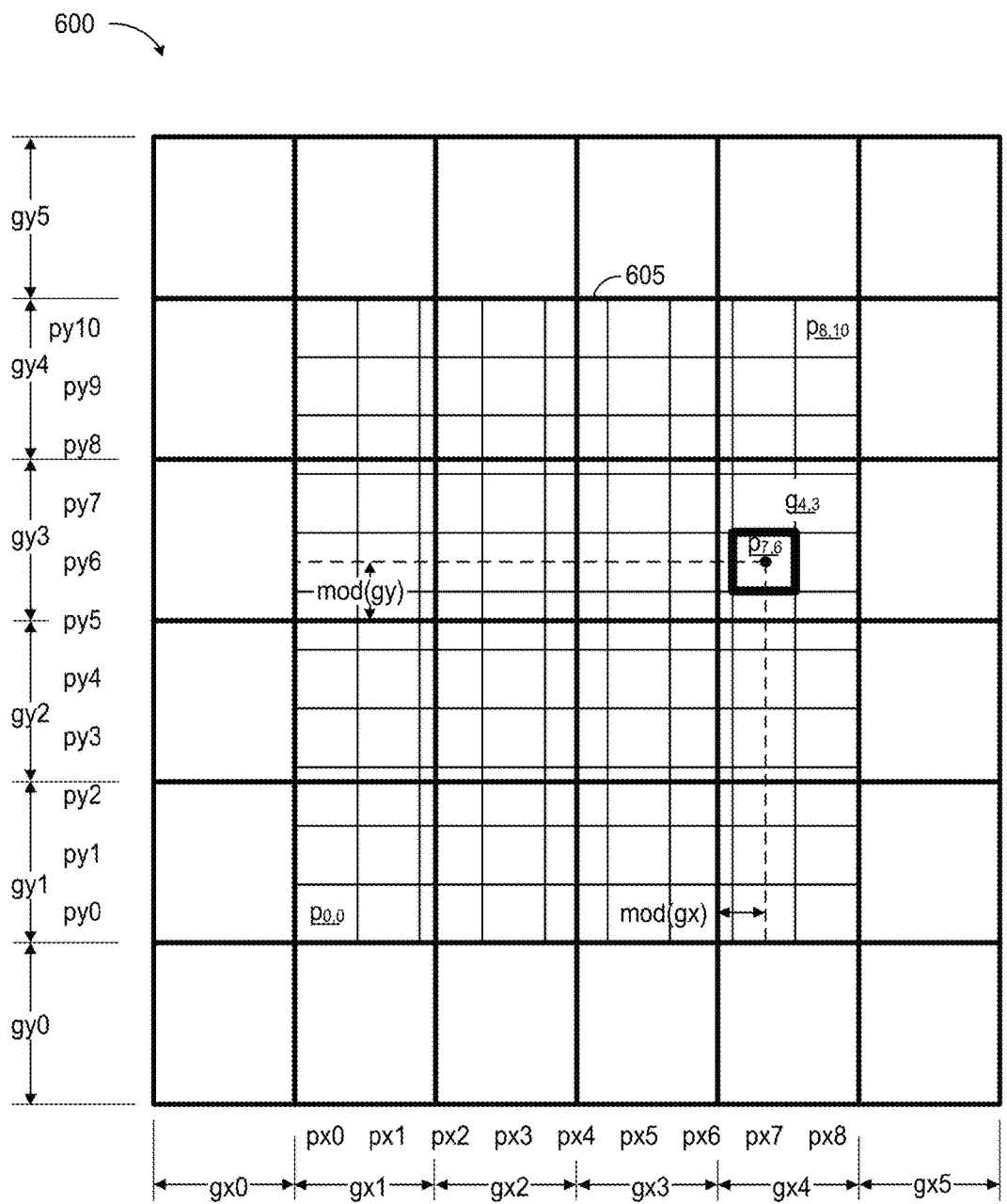
FIG. 10 depicts imaging device 600 with the details of subgratings $g_{i,j}$ obscured for ease of illustration.

FIG. 10 depicts imaging device 600 with the details of subgratings $g_{i,j}$ obscured for ease of illustration. The boundaries of subgratings $g_{i,j}$ are highlighted using lines that are bold relative to those of the underlying array of pixels $p_{i,j}$. A single pixel $p_{7,6}$ is also highlighted using a bold border. A dot in the center of pixel $p_{7,6}$ serves as a reference for pixel position relative to the subgrating array, and need not correspond to any physical structure. A point elsewhere on each pixel—e.g. a corner—could serve as a similar reference.

The center of pixel $p_{7,6}$, with reference to the array of subgratings, is located at gx3+mod(px7,gx) in the X dimension and gy2+mod(py6,gy) in the Y dimension. The displacements mod(px7,gx) and mod(py6,gy) place the center of pixel $p_{7,6}$ within overlaying subgrating $g_{4,3}$. The combination of mod(px7,gx) and mod(py6,gy) for pixel $p_{7,6}$ is unique among pixels $p_{i,j}$ with reference to their corresponding subgratings. The same is true of the remaining pixels. That is, no two pixels $p_{i,j}$ are located at the same position relative to their respective subgrating. Moreover, the modulo coordinates are evenly spaced along the X and Y axes.

Figure 11:
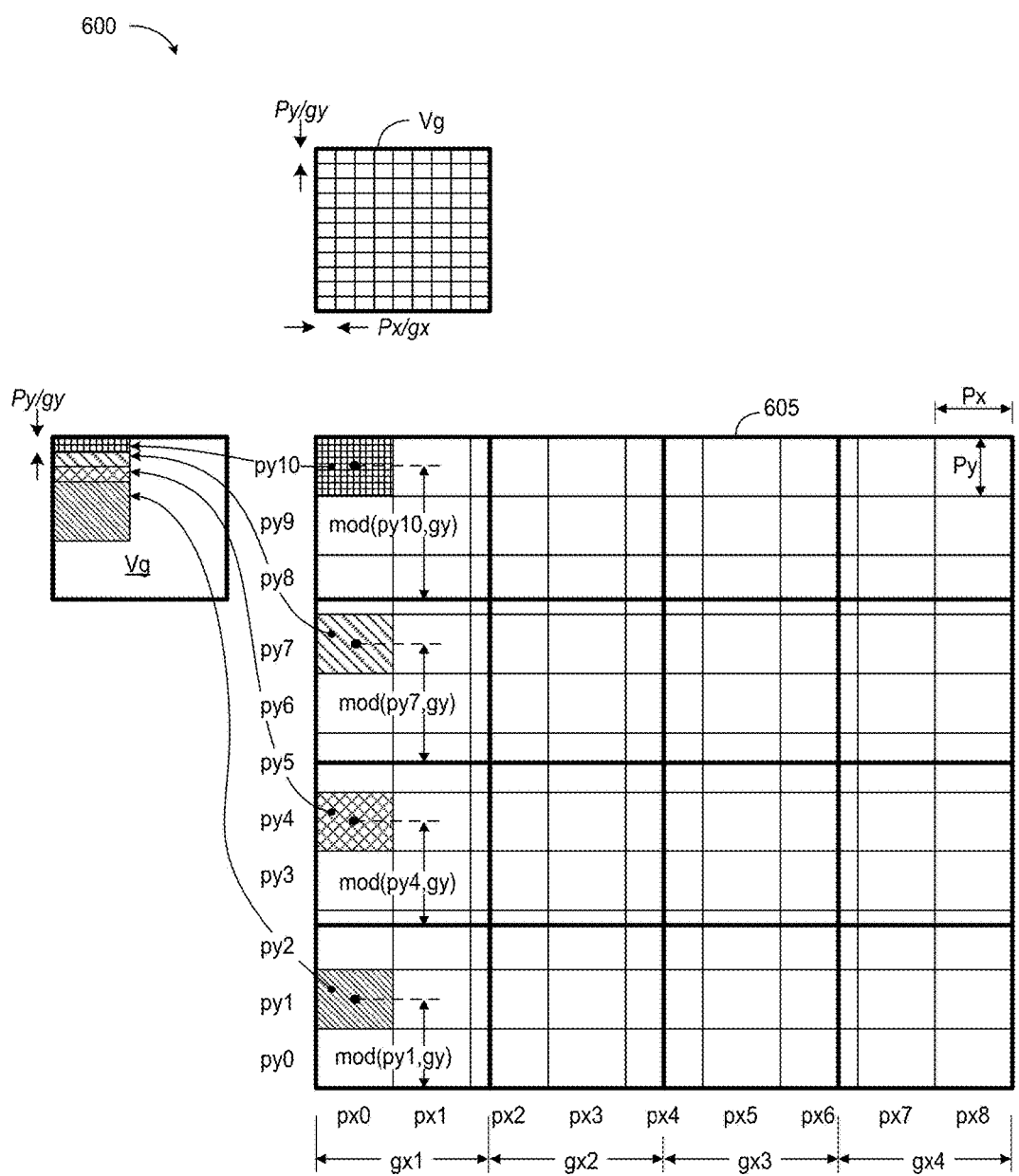
FIG. 11 depicts imaging device 600, again with the details of subgratings $g_{i,j}$ obscured for ease of illustration, with certain pixels shaded to illustrate their respective contributions.

FIG. 11 depicts imaging device 600, again with the details of subgratings $g_{i,j}$ obscured for ease of illustration, with certain pixels shaded to illustrate their respective contributions. Each physical pixel $p_{i,j}$ maps to a virtual location, similarly shaded, beneath a virtual archetypical subgrating Vg (at left). In the Y dimension, each of the four highlighted pixels is located a respective modulo gy from the lower boundary of its corresponding subgrating. These modulo are separated from one another by an offset Py/gy, which provides a virtual pixel size of the same extent. Though not shown, similar offsets for pixels along the X dimension provide a virtual pixel size of Px/gx. Pixels $p_{i,j}$ are thus distributed evenly in both the X and Y dimensions relative to the row and column intersections of the subgrating grid. The combination of the arrays of subgratings $g_{i,j}$ and pixels $p_{i,j}$ can thus be modeled as a single virtual subgrating Vg (top) with the same number of virtual pixels as there are pixels $p_{i,j}$. Imaging device 600 thus provides px times py independent measurements of the interference pattern from an archetypical subgrating.

The number of unique modulo coordinates preserves the resolution provided by pixel array 607. The even spacings of the modulo coordinates in the X and Y dimensions simplifies the mathematics required to extract image information using e.g. Fourier deconvolution, and thus limits the time and processing power required for image processing.

Due to the finite size of each pixel, there will be some spatial frequencies whose period in either of the X or Y dimensions fits an integral number of times into the pixel extent in that dimension, and thus may not be observed by device 600. Such frequencies can be in the null space for imaging tasks. However, the precise spatial frequencies causing such nulls may not be part of the discrete Fourier basis of frequencies describing a finite-sized sensor array. In other words, while the frequency response of the pixels incurs a sinc penalty from the square-wave profile of the pixels, this sinc (which has zeros) will not in general be sampled at its zeros if the total lateral dimensions of the array are not integer multiples of the extent of the pixel. In imaging device 600, for example, there is no spatial frequency in the discrete-Fourier-transform basis that cannot be sampled, so the system has full rank, and, with a sufficiently high signal-to-noise ratio (SNR), can produce images with as many free parameters as there are pixels.

Figure 12A:
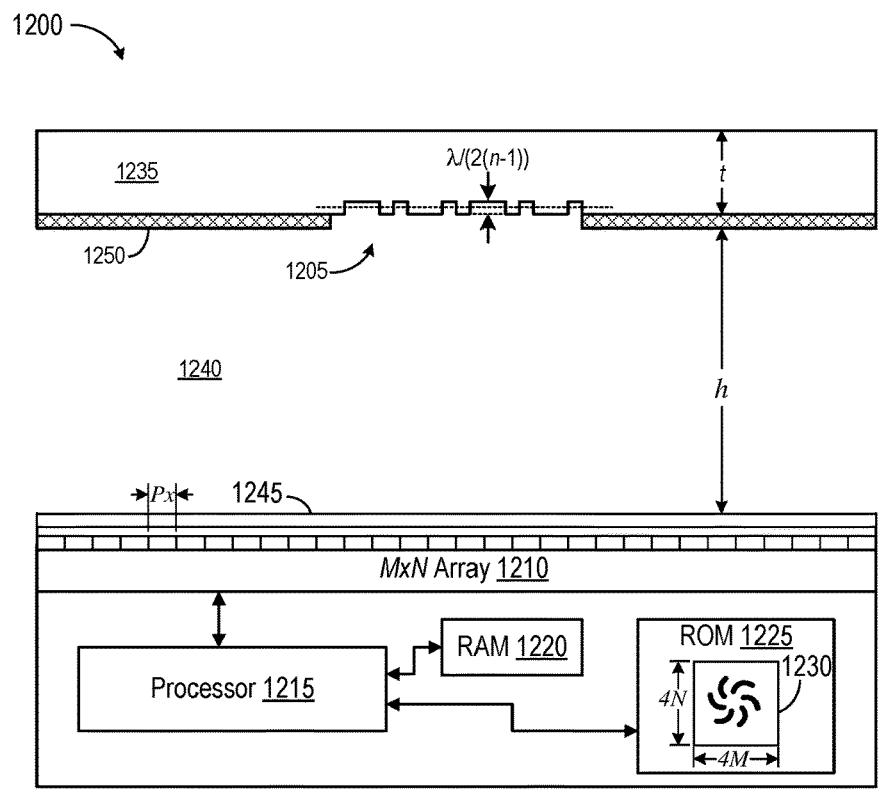
FIG. 12A is a cut-away view of an infrared (IR) imaging device 1200 with a binary, phase-antisymmetric grating 1205 overlying a microbolometer array 1210.

FIG. 12A is a cut-away view of an infrared (IR) imaging device 1200 with a binary, phase-antisymmetric grating 1205 overlying a microbolometer array 1210. As in the preceding examples, array 1210 captures an interference pattern produced by grating 1205, and an integrated processor 1215 extracts image information from the pattern. RAM 1220 and ROM 1225 support this extraction.

Processor 1215 performs a Fourier deconvolution of captured patterns using image-calculation parameter set 1230 stored in ROM 1225. Image-calculation parameter set 1230 characterizes grating 1205 at a resolution that is greater than that on offer from array 1210, four times greater in each of the X and Y dimensions in this example. Employing the relatively high-resolution image-calculation parameter set 1230 improves the resolution of extracted image information in the manner detailed previously in connection with FIG. 3.

Grating 1205 is formed by an interface between a polycarbonate plastic layer 1235 and an airspace 1240 separated from a glass cover 1245 over array 1210 by a height h of 0.8 mm. A metal layer 1250 forms an aperture 1.45 mm in diameter. Plastic layer 1235 can be e.g. POLY IR® 2, which is available from Fresnel Technologies Inc. of Fort Worth, Tex. (USA). Suitable IR-sensitive arrays are available from e.g. ULIS of Veurey-Voroize, France, and FLIR Systems, Inc. of Wilsonville, Oreg. (USA).

Figure 12B:
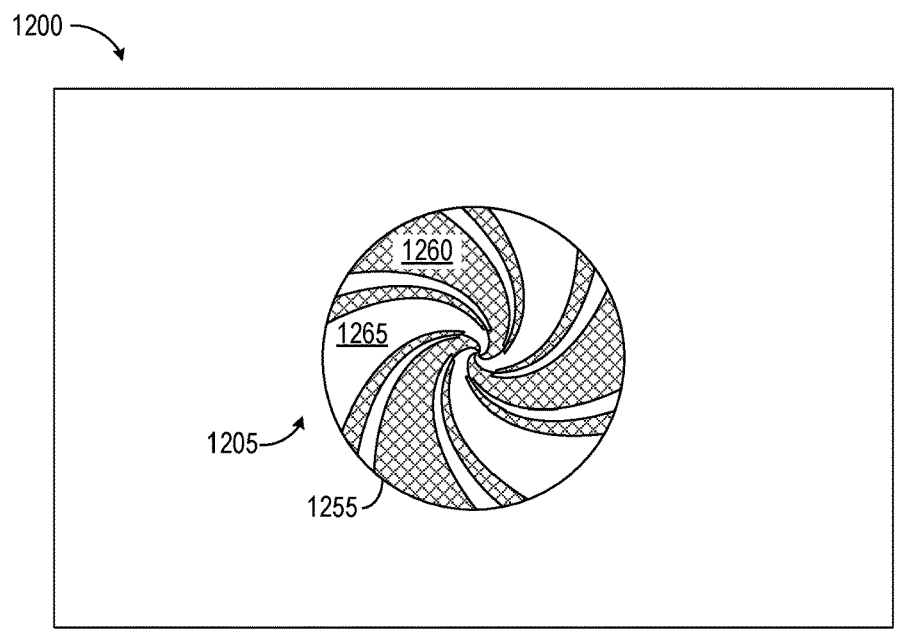
FIG. 12B is a plan view of imaging device 1200 of FIG. 12A showing grating 1205 within an aperture 1255 formed in layer 1250.

FIG. 12B is a plan view of imaging device 1200 of FIG. 12A showing grating 1205 within the aperture 1255 formed in layer 1250. Transparent features 1260 (dark) and 1265 (white) define between them boundaries of odd symmetry. Features 1260 are raised in the Z dimension (normal to the view) relative to features 1265 to form the spiral shapes.

While the subject matter has been described in connection with specific embodiments, other embodiments are also envisioned. For example:
1) the wavelength band of interest can be broader or narrower than those of the foregoing examples, and may be discontinuous;
2) the grating can be e.g. an amplitude grating rather than a phase grating. A linear array of pixels can be used alone or in combination with other linear arrays to sense one-dimensional aspects of a scene from one or more orientations;
3) imaging systems can be distributed such that all or a portion of the processing tasks noted previously can be performed at a location remote from that photodetector array; and
4) image data other than images can be sensed to e.g. locate or detect a point source or other feature(s) of a scene.

Other variations will be evident to those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. An imaging system comprising:
    a phase grating exhibiting a point-spread function and receiving incident light, the phase grating casting an interference pattern responsive to the incident light, the phase grating including boundaries of odd symmetry separating stepped features on opposite sides of each boundary;
    a photodetector array to sense and capture the interference pattern at a first resolution, the stepped features on the opposite sides of each boundary offset from the photodetector array;
    an image-calculation parameter set at a second resolution greater than the first resolution; and
    at least one processor to upsample the captured interference pattern from the first resolution to the second resolution, and to compute an image from the image-calculation parameter set and the upsampled interference pattern;
    the boundaries of odd symmetry to induce a phase difference of half of a wavelength the incident light, plus an integer multiple of the wavelength, to produce curtains of destructive interference at the photodetector array.

2. The imaging system of claim 1, further comprising non-volatile memory to store the image-calculation parameter set.

3. The imaging system of claim 1, wherein the processor and photodetector array are integrated.

4. The imaging system of claim 1, wherein the wavelength is in the infrared region of the electromagnetic spectrum.

5. The imaging system of claim 1, wherein the processor, in computing the image, employs Fourier deconvolution of the upsampled interference pattern.

6. The imaging system of claim 1, wherein the image-calculation parameter set comprises a point-spread function.

7. The imaging system of claim 1, wherein the image-calculation parameter set comprises a Fourier transform of the point-spread function.

8. The imaging system of claim 1, further comprising an integrated aperture.

9. A method of imaging a scene, the method comprising:
passing infrared light from the scene through an optical element having a point-spread function, the optical element casting a pattern responsive to the infrared light;
sampling the pattern at an image-capture resolution;
upsampling the sampled pattern to an image-processing resolution greater than the image-capture resolution to produce an upsampled pattern; and
computing an image of the scene from the upsampled pattern and an image-calculation parameter set of the optical element;
wherein the image-calculation parameter set of the point-spread function is of the image-processing resolution.

10. The method of claim 9, wherein the computing the image includes Fourier deconvolution of the upsampled pattern.

11. The method of claim 9, further comprising resampling the image of the scene.

12. An imaging system comprising:
a phase grating exhibiting a point-spread function and receiving incident light, the phase grating comprising boundaries of odd symmetry casting a response responsive to the incident light;
an image-calculation parameter set at a first resolution;
a photodetector array to sample the response at a second resolution less than the first resolution; and
at least one processor to upsample the sampled response and compute an image from the image-calculation parameter set and the upsampled response;
the phase grating to induce a phase difference of half of a wavelength the incident light, plus an integer multiple of the wavelength, to produce curtains of destructive interference at the photodetector array.

13. The imaging system of claim 12, wherein the upsampled response is of the first resolution.

14. The imaging system of claim 12, wherein the image-calculation parameter set comprises a point-spread function of the phase grating.

15. A method of imaging a scene, the method comprising:
passing infrared light from the scene through an optical element having a point-spread function, the optical element casting a pattern responsive to the infrared light;
sampling the pattern at an image-capture resolution;
upsampling the sampled pattern to an image-processing resolution greater than the image-capture resolution to produce an upsampled pattern; and
computing an image of the scene from the upsampled pattern and an image-calculation parameter set of the optical element;
wherein the optical element comprises a phase grating, the phase grating including boundaries of odd symmetry separating stepped features on opposite sides of each boundary, the phase grating to induce a phase difference of half of a wavelength of the infrared light, plus an integer multiple of the wavelength, to produce curtains of destructive interference.

* * * * *